R. W. SPRINGER.
FLYING MACHINE.
APPLICATION FILED APR. 4, 1906.
1,202,449.
Patented Oct. 24, 1916.
2 SHEETS—SHEET 1.
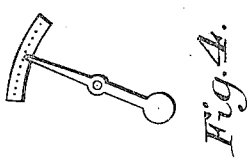
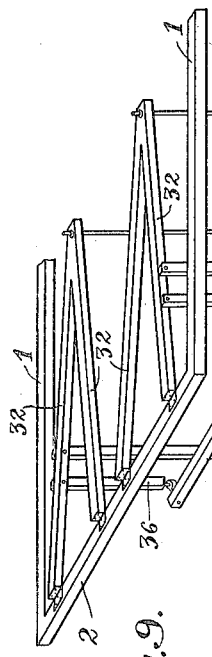
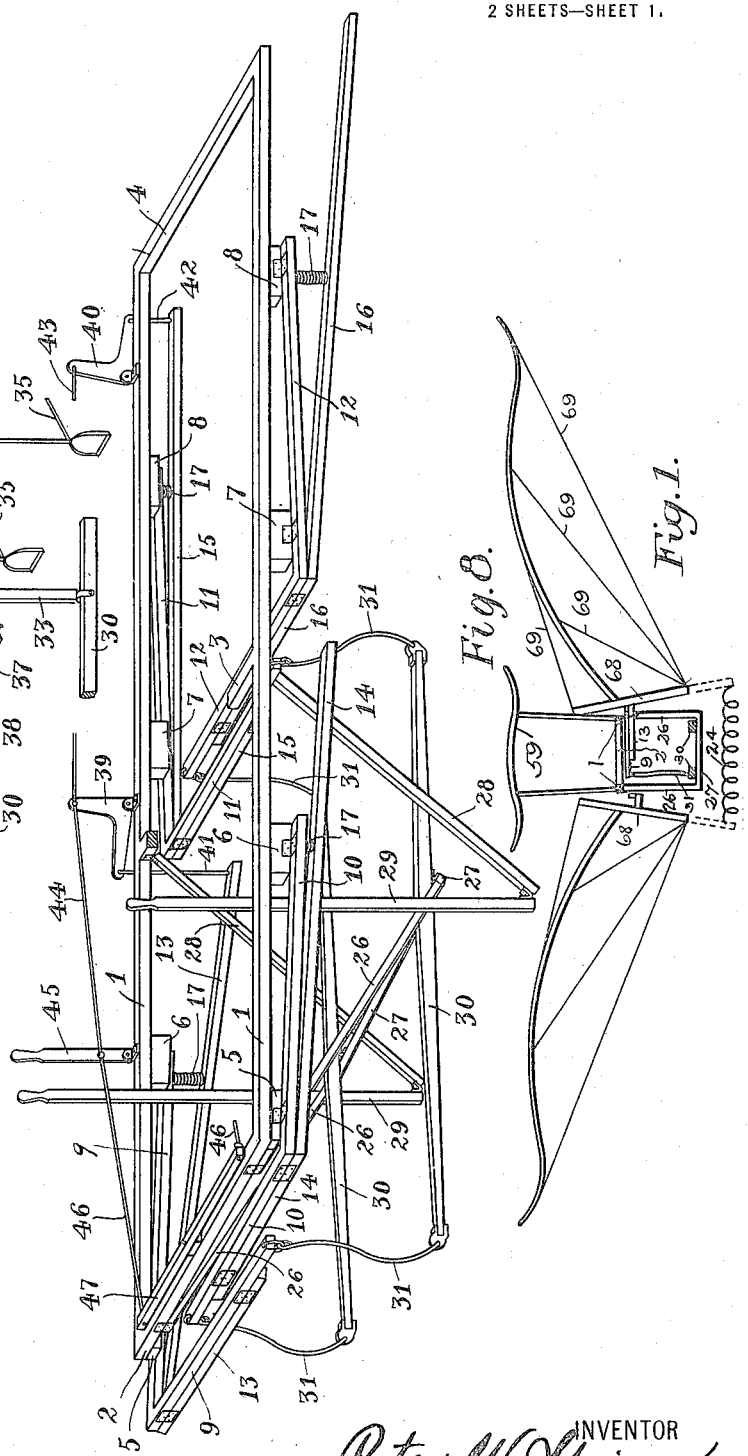
WITNESSES:
INVENTOR
ATTORNEY

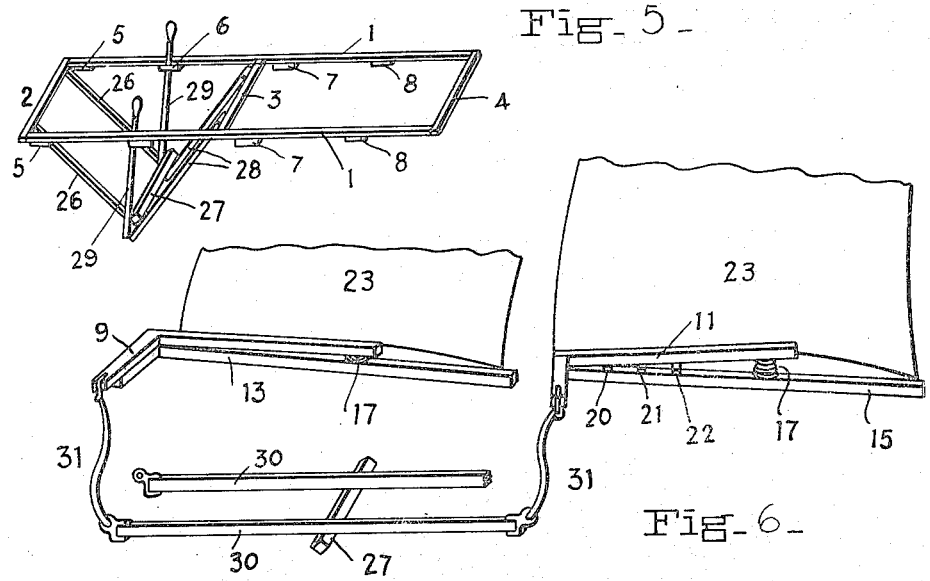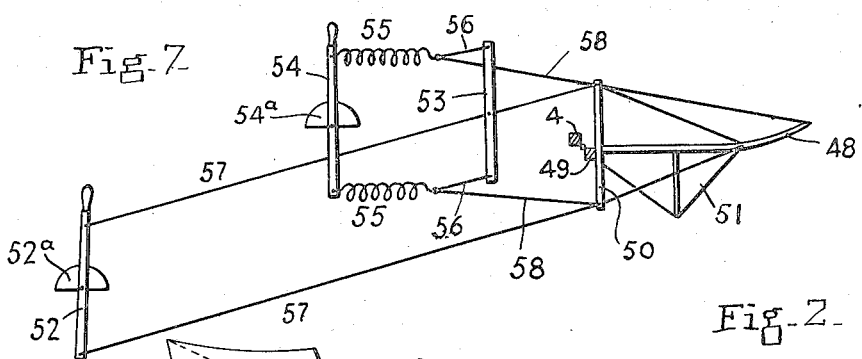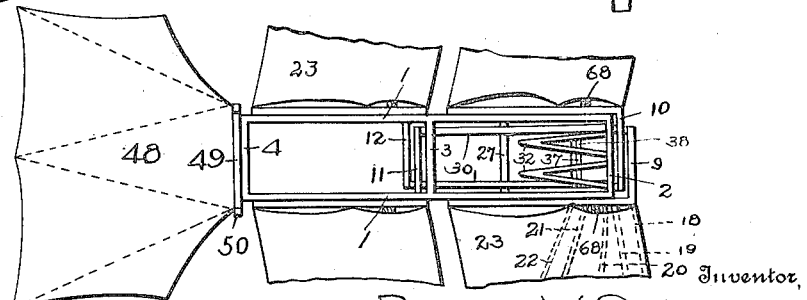

UNITED STATES PATENT OFFICE.

RUTER W. SPRINGER, OF SPRINGFIELD, ILLINOIS.

FLYING-MACHINE.

1,202,449.  Specification of Letters Patent.  Patented Oct. 24, 1916.

Application filed April 4, 1906. Serial No. 309,911.

*To all whom it may concern:*

Be it known that I, RUTER W. SPRINGER, a citizen of the United States, residing at Springfield, in the county of Sangamon and State of Illinois, have invented certain new and useful Improvements in Flying-Machines, of which the following is a specification.

The object of my invention is to provide a machine for safely and rapidly navigating the air; as set forth hereinafter and particularly pointed out in the claims.

There are several methods of aerial navigation. The first is by apparatus which, in the gross, is lighter than air, or buoyant. This may be with or without a motor. There is in nature no good example of this method of aerial navigation, but it is seen in aqueous navigation in most of the fishes.

A second method consists in providing a flat surface, by the reaction of the air upon which the entire apparatus is to be supported. This flat surface or aeroplane must be driven forward by propellers or fans. Its front end will be slightly elevated. The entire apparatus is usually heavier than air, sometimes considerably heavier. On the other hand, the aeroplane may be constructed in the form of, or in conjunction with, buoyant floats which will more or less support the weight of the apparatus; and this buoyancy may be increased until the first form of aerial navigation has been reached. The second form of aerial navigation is represented in most insects, whose bodies are light and whose wings impinge upon the air on both their upper and lower surfaces. These wings are therefore, strictly speaking, reciprocating propellers, or fans, and verge into the third form of aerial navigation.

The third method of aerial navigation is that wherein a rapidly moving propeller reacts practically downward against the air, so as to cause the entire apparatus to move vertically upward. This is seen in nature in the hovering of insects and smaller birds, and is the most expensive form of aerial navigation which is known.

A fourth method of aerial navigation consists in providing supporting planes which reciprocate more or less vertically, but at all times have the air pressure upon their lower surfaces. In this method, forward motion is attained through the resultant of the weight of the apparatus and the pressure of the air acting upon the wings. There must, therefore, be weight much beyond that of the air, or there can be no forward motion. In this method of flight, the wings must move somewhat slowly, because, if they move rapidly, there will be an air pressure upon the upper surface. I believe that the most of the birds fly in this manner and according to the method I am now claiming; but I have nowhere seen any proof of the fact in any publication.

Figure 1 is an end view of the apparatus, diagrammatically drawn, and with many portions omitted; Fig. 2 is a top view of the same, diagrammatically represented, and with parts omitted; Fig. 3 is a cross section of a wing, taken on a fore-and-aft line about midway between the edges of the wing; Fig. 4 illustrates a speed-indicating device; Fig. 5 is a perspective view of the main frame; Fig. 6 is a fragmentary perspective view illustrating the wing-operating mechanism at one side of the machine; and Fig. 7 is a partly diagrammatic view of the tail-operating mechanism; Figs. 8 and 9 are perspective views of parts of the apparatus shown in enlarged detail for the purpose of bringing out the relative location of many of the parts.

Owing to the limitation of space, and in order to show everything in connected working order, the drawing has had to be made diagrammatic, to a very large extent. Figs. 1, 2 and 5 are on the same scale, and Figs. 6, 7, 8 and 9 are on a larger scale.

In the following description, some words have had to be used in a special sense. This has always, however, been pointed out, and the exact meaning of the word has in every instance been carefully defined.

The details of construction shown in the accompanying drawing and herein described relate to a form adapted for one aeronaut, who is to propel the apparatus by his own power; but it is perfectly evident that the same principles can be employed for larger machines, and it is so intended to be claimed.

Two long side-bars (1) perhaps 14 feet long, are (Figs. 2, 5 and 8) provided with three cross-pieces (2), (3), (4). On the under side of each of these longitudinal bars (1), are blocks (5) (6) (7) (8). Upon the front two blocks (5) and (6) on the right side, is hinged an L-shaped shoulder-piece (9); and, on the left side (see Figs. 2 and 8) a corresponding shoulder-piece (10). Similar shoulder-pieces (11) (12) are hinged below the rear blocks (7) and (8), on each side. The medial blocks (6) and (7) are a little thicker than the front and rear blocks (5) and (8); so that the forward shoulder-pieces incline slightly more upward in front. Below each of these shoulder-pieces is hinged, on the transversely projecting arm thereof, a wing-stock (13), (14), (15), (16). The backwardly-projecting portion of the wing-stock lies directly below the backwardly-projecting portion of its corresponding shoulder-piece; and a spring (17), of limited power and motion, tends to press these apart. The ribs (18), (19), (20), (21), (22), of each wing shown in dotted lines in Fig. 2 are fastened upon its respective wing-stock; and are to be covered with a membrane (23).

The membrane (23) is securely fastened to all the ribs of a wing, and to the wing-stock. Owing to the greater thickness of the blocks (6) and (7), the front wings will incline slightly more upward at the front and the rear wings will incline slightly more upward at the rear; and, under the influence of the springs (17), the wings will, all of them, have a tendency to drop at the rear edge when not under the full pressure of the air. This change of position, which is produced partially under the action of the springs (17), is called changing their pitch, or feathering; and the difference of pitch between the front and rear wings, owing to the greater thickness of the blocks (6) and (7), is described as a pitch convex below. Each wing-stock has a substantially vertical truss-bar (68)—Fig. 1—from which strengthening wires (69) extend out to the various ribs. These truss-bars (68) may, as shown dotted in Fig. 1, be extended somewhat farther downwardly and be provided with a spring (24), which, by contraction, will draw the wings forcibly downward and oppose the static pressure of the air upon the lower surfaces of the wings due to the weight of the machine and cargo. It is evident that these springs (24) may be made in a great variety of forms and attached in a variety of ways: the only requirement being that they shall operate against the pressure of the air upon the under surfaces of the wings.

Fig. 1 plainly shows the outline of the wing from its axis to its tip. During the greater part of its length, commencing from the axis, or shoulder, the wing is concave below; but, near the outer end of the wing, its outline is reversed and it is made rigidly and permanently convex below. This form gives greater stability in the air, in a lateral direction.

In Fig. 3, which represents a cross-section fore-and-aft of a wing, the left-hand side of the figure represents the front edge of the wing. It will be seen that the same principle has been followed in the fore-and-aft outline of the wing that was adopted in the lateral outline. The front edge of the wing comes down sharply; and the ribs (18) and (19), near the front edge, are close together. From here, the wing gradually curves backward, concave below, to the rib (21); and from here the outline is reversed and the wing becomes somewhat convex below. This form gives greater stability in the air, in a fore-and-aft direction, especially where only one pair of wings is used,—in which case the rear convex portion should be made considerably longer. In a machine having more than one pair of wings, the fore-and-aft stability can be still further increased by making the pitch convex below, as previously described.

Hinged to the front cross-bar (2) are two brace bars (26), shown in Figs. 1, 5 and 8. Across the lower end of these is a strong square fulcrum-bar (27). Similarly hinged to the cross-bar (3) are the brace-bars (28); which, with the bars (26) and the frame-pieces (1), form a triangular bracing. The lower end of these brace-bars (28) is not, however, directly attached to the bars (26); but, intermediately, through the set-bars (29), which are hinged to both the bars (28) and the fulcrum bar (27); and which are provided, at their upper ends, with handles and with any suitable clamping apparatus, not shown. Across this fulcrum bar (27) extend—see Figs. 6 and 8—two longitudinal levers (30). These levers are connected by links (31) to the movable ends of the shoulder-pieces (9), (10), (11), (12). The curved shape of these links (31) is given to them so that, in passing between the opposite shoulder-piece and the cross pieces of the frame they shall not collide therewith. It will be seen, from the construction of the levers (30), that, when one wing is down, the other wing on the same side of the machine will be up; and vice versa; and that the static pressure of the air under one wing is supported or compensated absolutely by the static pressure of the air under the other wing. This principle is called "balancing" the air-pressures. The springs (24) may in like manner be said to "support" the air pressure. Both cases may be grouped under the generic term, to "counteract" the air pressure. The springs (24) may be used in connection with the levers (30), in which case the levers need not be so strong and so heavy. By operating a set-bar (29), the fulcrum-bar (27) can be raised and lowered; thus lowering and raising all the wings together by the raising and lowering of levers (30). This will cause an angular change of position of the oscillating or flapping wings, in relation to the horizontal and this relation is called their "set;" hence the name, "set-bars," which adjust the set of the wings. The stability of the machine in the air, in a lateral direction, also depends very largely upon the set of the wings; and is inversely to the supporting power of the wing. In calm weather, the wings may be brought considerably lower, or flatter, by drawing back "set-bars" (29); and greater speed can then be obtained; but, if a sudden flurry is encountered, the set-bars should be immediately thrown forward, raising the tips of the wings, lowering the center of gravity and increasing the lateral stability.

Attached to the front cross-brace (2) are the pedal levers (32), made in V-shape to give them greater lateral rigidity, see Figs. 2 and 9. These pedal levers (32) are connected by links (33) with the levers (30), and have stirrups depending from straps (34) at their rear ends. These stirrups are connected with the rear part of the frame by cords or straps (35), so as to regulate their motion and prevent them swinging forward under the pressure of the foot, when operated. Attached to the pedal levers (32), also, are the links (36); whose lower ends are attached to a transverse lever (37), which is centrally pivoted on a cross-frame (38). The operation of this transverse lever is such as to cause the longitudinal levers (30) to reciprocate alternately, or in opposite phase. The result of this is that the right wing of each pair rises as its opposite left wing falls, and vice versa. Thus, the left-hand wing of the forward pair and the right-hand wing of the rear pair are descending at the same time that the right-hand wing of the first pair and the left-hand wing of the second pair are rising. This produces a very awkward-appearing motion, in the flying machine, but results in greater stability. If four or more pairs of wings are used, the two wings of each pair may rise and fall synchronously; the form adapted, as here shown, is called asynchronous oscillation.

Attached to the frame-bars (1) are bell cranks (39) and (40), connected in alternate phase, by links (41) and (42), with the rear ends of the wing-stocks,—the wing-stocks upon the right side being numbered (13) and (15) respectively. These two bell cranks are connected together by links (43), one on each side of the machine; and are further connected by links (44) to handles (45), and by links (46) to a transverse lever (47), and so to the bell cranks on the opposite side of the machine. Only one handle (45) is necessary. Sometimes, in a wind-flurry, or under a heavier or lighter cargo, the springs (17) may not act satisfactorily: in this case, the handle (45) is operated so as to coöperate with the springs.

The operation of the wings may now be described. The aeronaut places his feet in the stirrups of the straps (34); and depresses them alternately. This, through the levers (30) causes the wings to oscillate, or flap, alternately, or asynchronously, as previously described. The machine is supposed to be moving swiftly forward through the air, in a slightly downward direction: soaring, as it is called. When two of the wings are caused quickly to descend, they assume a greater portion of the weight of the machine and cargo; and a corresponding portion of the weight is relieved from the other two wings. The rising wings being thus relieved of a part of the air pressure on their lower surfaces, their springs (17) expand, causing the rear edges of the rising wings to droop somewhat lower. Thus a greater portion of air will strike the under portion of the rising wings; and, instead of their having to be lifted against the pressure of the air on their upper surfaces, they will be buoyed up by the additional pressure of the air on their lower surfaces, which will be almost as great as the normal pressure when soaring. When the rising wings have reached the upward limit of their motion, they are brought quickly downward, and the other wings are caused in like manner to rise. The descending wings, at each flap, will lift the machine in the air about one-third the height traveled by the tips of the wing; and the rising wings will, therefore, be lifted through the air a proportionately larger distance. Thus, while the machine is continually soaring downward, the wings are continually lifting it upward. The forward motion will depend upon the amount of "dip" of the machine: that is to say, the amount that its front end is lower in the air than its rear end. The dip can be increased by throwing the weight of the aeronaut farther forward; and also by the action of the tail. As the dip increases, the velocity of flight increases, and the downward motion doubly increases: to compensate for this the wings must be operated about four times as fast (or even more, owing to the increase of the other factors). In a form of machine where only one pair of wings is used, and the springs (24) sustain the whole of the weight of the machine and cargo, the springs (17) may be dispensed with, and the droop of the wings be produced by slightly elevating the tail just before the wings are raised; although the other form will also operate.

The tail (48) is attached to the rear crossbar (4), the tail stock (49) being hinged thereto. The rear end of the tail is curved slightly upward, as shown in Fig. 7. Steering truss-bars (50) are vertically attached at each end of the tail-stock (49); and wires extend therefrom to various parts of the tail. A rudder fin (51) is placed longitudinally and centrally on the lower surface of the tail; and assists to keep the machine "head-on" in its flight. One of the truss-bars (50) is attached by wires (57) to a handle (52). These wires are used for positively controlling the motion of the tail; and the handle (52) may be provided with any convenient form of clamp (52ª). A cross-piece (53) is pivoted slightly in front of either the same truss-bar (50) or of the one on the opposite side; and a handle (54) is similarly pivoted in front of it. This handle (54) is connected, both above and below its pivot, with the cross-piece (53), by means of springs (55) and chains or cords (56). The rear ends of these springs (55) are also connected, by chains or cords (58), with the upper and lower ends of the truss-bar (50), on that side of the machine. The cross-piece (53) and cords (56) keep the springs (55) under a certain initial tension, which may be previously determined upon, usually sufficient to support the weight of the tail. The handle (54) is clamped, by the lock (54ª), into such a position as to hold the tail normally at the proper angle for flight at a certain speed; and is not thereafter ordinarily to be moved, during that flight. Slight changes in the position of the tail may then be made by operating the handle (52); the springs (55) allowing the tail to be moved and bringing it back again to its proper position when the handle (52) is released. The object of the cross-piece (53) is to keep the springs (55) at an initial tension without permitting them to operate against one another upon the wing: the cross-piece (53) thus providing a positively determined point of rest for the tail.

The operation of the tail is as follows:—
The weight of the cargo (which includes the aeronaut) is thrown so far forward that the flight of the machine should be considerably swifter than what is desired. Then the tail is slightly elevated, so as to catch the air on its upper surface. When the flight is somewhat slow, the action of the air upon the upper surface of the tail, tending to decrease the dip of the machine, will be slight; and the course will be continued with increasing velocity. As the velocity reaches the desired amount, the lever (54) is moved forward until that velocity becomes established, by the greater impinging of the air upon the tail. Thereafter, the operation of the tail is practically automatic: as the speed of flight increases, the air pressure upon the upper surface of the tail correspondingly increases; and the head of the machine is brought up and the velocity checked.

Fig. 4 shows a pendulum and scale, which is to be attached to any convenient place upon the side-frame of the machine; and which, by indicating the dip will approximately indicate the speed of flight. A canopy-parachute (59) may be placed above the body of the machine to assist in the flight and to act as a factor of safety, in case of accident.

I do not in this case claim the art of continuous gravitational aerial navigation, which consists in presenting the supporting surfaces of a flying machine when in motion to the atmosphere at such an angle as will cause the machine, under the influence of gravity, to glide forwardly and downwardly, then changing the angle of the said supporting surfaces to the air so as to increase their angle of incidence and cause a lifting effect upon the machine, then changing the angle of the said supporting surfaces to again cause the machine to glide downwardly, and successively, and rhythmically repeating these changes; and at the same time these operations are taking place causing up and down movements of the supporting surfaces, relative to the flying machine as a whole, these latter movements being timed and synchronized with reference to the changes of the angles of the supporting surfaces as set forth, so that the downward movements thereof are caused during the time the supporting surfaces are more downwardly inclined, and the upward movements during the other inclinations thereof, as this subject matter has been presented and claimed by me in an application filed April 20, 1906, Serial No. 312,891.

Having thus fully described my invention and its mode of operation I claim:—

1. A flying machine provided with a plurality of pairs of supporting wings arranged tandem, those nearer the front of the machine having an inclination relatively upward toward the front, and those near the rear an inclination relatively upward toward the rear, whereby the longitudinal pitch of the wing surface of the machine as a whole is convex below and means for imparting to the wings flapping movements.

2. In a heavier than air flying machine, a supporting wing, a hinged wing stock to which the wing is fastened, a hinged shoulder piece by which the wing stock is supported, and a spring tension device between the shoulder piece and wing stock arranged to cause the rear edge of the wing to droop.

3. In a heavier than air flying machine, a supporting framework, a pair of flapping wings, a pair of frames pivotally connected with the supporting framework and arranged to swing about axes approximately parallel with the longitudinal axis of the machine, intermediate frames to which the wings are directly secured pivotally united to the aforesaid pivoted frames on lines substantially at right angles to the longitudinal axis of the machine, and spring tension devices acting upon the last said frames and arranged to cause the rear edges of the wings to droop, thus permitting the wings when in use to automatically change pitch.

4. In a heavier than air flying machine, a supporting framework, a pair of flapping wings, a pair of frames pivotally connected with the supporting frame on lines approximately parallel with the longitudinal axis of the machine, intermediate frames to which the wings are directly secured pivotally united to the aforesaid pivoted frames on lines substantially at right angles to the longitudinal axis of the machine, spring tension devices acting upon the last said frames and arranged to cause the rear edges of the wings to droop, thus permitting the wings when in use to automatically change pitch; and manually controlled means for varying the pitch of the said wings.

5. A flying machine provided with supporting wings of changeable pitch, mechanism for controlling the pitch of said wings, in combination with mechanism by which the static air-pressure under one wing is balanced by that under another.

6. A flying machine provided with supporting wings of automatically and independently changeable pitch, mechanism for controlling the pitch of said wings, in combination with mechanism for producing a synchronous oscillation of the wings on the same side of the machine as well as those which are transversely opposite to each other.

7. In a flying machine having a tail that is vertically movable, the combination with such tail of adjustable means for changing the angle thereof elastically connected with the tail, whereby the latter may be set and held forcibly although elastically, and means for positively setting the tail at will irrespective of the said elastically connected setting means.

8. In a flying machine, a wing which on its lower surface is concave next the front and is concave next the shoulder and permanently convex toward the tip.

9. A flying machine provided with flapping wings, in combination with mechanism for regulating the set of said wings, as distinguished from the flapping, and without interrupting the flapping operations.

10. A flying machine provided with flapping wings, in combination with mechanism for regulating the set of the wings, means for controlling the said mechanism at will and means for imparting to the wings flapping movements.

11. A flying machine provided with flapping wings, in combination with mechanism for simultaneously adjusting vertically the tips of the wings with reference to the body of the machine while in the air and suspended by the wings and means for imparting flapping movements to the wings.

12. A flying machine provided with a movable tail hinged to the rear of the frame of the machine and permanently upwardly turned at its rear end.

13. In a flying machine the combination with side-bars supporting two pairs of oscillating wings, of the longitudinal levers, fulcrumed upon framework connected with the side-bars and provided with links connecting them to the wing mechanism.

14. In a flying machine, the combination with wings quickly and separately adjustable in pitch, of a vertically movable tail.

15. In a flying machine, a frame, two pairs of wings of changeable pitch hinged to said frame, and connections for moving the wings of each pair simultaneously in opposite directions, and for moving each pair of wings in directions opposite to the movement of the other pair of wings.

16. In a heavier than air flying machine, the combination of a framework, supporting wings secured thereto, means for rhythmically imparting to the wings up and down movements at a speed that insures that supporting pressure shall be maintained on the lower sides thereof on the upward as well as on the downward strokes thereof, and means for causing the wings as they move upwardly to tilt, against a resistance of the air upon the lower surface of the wings greater than that acting upon their upper surfaces, and to assume positions with their front edges raised relative to their rear edges, as compared with the positions they occupied when they moved downwardly—whereby as the supporting efficiency of the wings decreases, due to said upward motions thereof, the wings are caused to pass along more upwardly inclined supporting planes of air.

17. In a heavier than air flying machine, the combination of a framework, supporting wings secured thereto, means for rhythmically imparting to the wings up and down movements at a speed that insures that supporting pressure shall be maintained on the lower sides of the wings on the upward as well as on the downward strokes thereof, and automatically operating means for causing the wings as they move upwardly to tilt, against a resistance of the air upon the lower surface of the wings greater than that acting upon their upper surfaces, about axes substantially transverse to the direction of motion of the machine and to assume positions with their front edges raised relative to their rear edges, as compared with the positions they occupied when moving downwardly.

In testimony whereof I affix my signature in presence of two witnesses.

RUTER W. SPRINGER.

Witnesses:
 JESSE C. BROOKE,
 LUCIA M. DELANO.